United States Patent
Perets et al.

(10) Patent No.: US 7,321,632 B2
(45) Date of Patent: Jan. 22, 2008

(54) METHOD AND APPARATUS FOR MULTI-ALGORITHM DETECTION

(75) Inventors: Yona Perets, Ra'anana (IL); Daniel Yellin, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 10/673,267

(22) Filed: Sep. 30, 2003

(65) Prior Publication Data

US 2005/0071397 A1 Mar. 31, 2005

(51) Int. Cl.
*H04L 5/12* (2006.01)

(52) U.S. Cl. .................. 375/262; 375/316; 375/341; 375/349; 455/571; 455/343; 455/127; 455/419; 455/67.3

(58) Field of Classification Search ............... 375/262, 375/316, 341, 349; 455/571, 343, 127, 419, 455/67.3, 263, 312, 337
See application file for complete search history.

(56) References Cited

U.S. PATENT DOCUMENTS

| | | | | |
|---|---|---|---|---|
| 4,335,361 | A * | 6/1982 | Acker | 330/285 |
| 5,487,085 | A * | 1/1996 | Wong-Lam et al. | 375/230 |
| 5,606,548 | A * | 2/1997 | Vayrynen et al. | 370/252 |
| 5,770,927 | A * | 6/1998 | Abe | 375/340 |
| 5,787,118 | A | 7/1998 | Ueda | |
| 5,848,106 | A * | 12/1998 | Khayrallah | 375/340 |
| 6,067,295 | A | 5/2000 | Bahai et al. | |
| 6,084,926 | A * | 7/2000 | Zak et al. | 375/341 |
| 6,151,487 | A | 11/2000 | Kim et al. | |
| 6,272,116 | B1 * | 8/2001 | Kurihara | 370/311 |
| 6,333,953 | B1 * | 12/2001 | Bottomley et al. | 375/316 |
| 6,553,065 | B1 * | 4/2003 | Tuutijarvi | 375/224 |
| 6,580,930 | B1 * | 6/2003 | Fulghum et al. | 455/574 |
| 6,763,074 | B1 * | 7/2004 | Yang | 375/328 |
| 6,907,063 | B2 * | 6/2005 | Khullar et al. | 375/224 |
| 7,082,172 | B1 * | 7/2006 | Pringle et al. | 375/316 |
| 2002/0034223 | A1 * | 3/2002 | Doetsch et al. | 375/232 |
| 2003/0100282 | A1 * | 5/2003 | Kandala | 455/234.1 |
| 2003/0123583 | A1 | 7/2003 | Yellin et al. | |
| 2005/0152317 | A1 * | 7/2005 | Awater et al. | 370/338 |

FOREIGN PATENT DOCUMENTS

EP 0 991 197 4/2000

OTHER PUBLICATIONS

International Search Report for PCT/US2004/030230, mailed on Feb. 25, 2005.

Balaban, et al. Optimum Diversity Combining and Equilization in Digital Data Transmission with Application to Cellular Mobile Radio—Part 1: Theoretical Cosiderations, IEEE Transactions on Communications, vol. 40, No. 5, May 1992.

Balaban, et al. Optimum Diversity Combining and Equilization in Digital Data Transmission with Applications to Cellular Mobile Radio—Part 1: Numerical Results, IEEE Transactions on Communications, vol. 40, No. 5, May 1992.

Saltzberg, Burton. Intersymbol Interference Error Bounds with Application to Ideal Bandlimited Signaling, IEEE Transactions on Information Theory, vol. IT-14, No. 4, Jul. 1968.

Winters, Jack. Optimum Combining in Digital Mobile Radio with Cochannel Interference, IEEE Journal on Selected Areas in Communications, vol. SAC-2, No. 4, Jul. 1984.

* cited by examiner

*Primary Examiner*—Chieh M. Fan
*Assistant Examiner*—Siu M Lee
(74) *Attorney, Agent, or Firm*—Pearl Cohen Zedek Latzer, LLP

(57) ABSTRACT

Embodiments of the present invention provide a method, apparatus and system for detecting a transmitted signal according to a detection algorithm selected from two or more detection algorithms based on a predetermined selection criterion.

32 Claims, 5 Drawing Sheets

METHOD AND APPARATUS FOR MULTI-ALGORITHM DETECTION

BACKGROUND OF THE INVENTION

A wireless communication device may include a receiver to receive a transmitted signal traveling through a wireless communication channel. The receiver may include a detector to detect symbols of the transmitted signal. The transmitted signal may be affected, e.g., distorted or corrupted, by various types of interference while traveling through the channel. Types of interference may include, for example, white noise, Adjacent-Channel Interference (ACI) or Co-Channel Interference (CCI).

There are detectors using pre-defined detection algorithms intended to improve performance in an environment characterized by white noise interference.

There are also detectors of multiple-antenna receivers using pre-defined detection algorithms intended to improve performance in an environment characterized by CCI.

Detectors using pre-defined detection algorithms may provide sub-optimal results in a dynamically changing environment, e.g., due to movement of a user of the device implementing the algorithm or movement of other users. A relatively small change in the environment, e.g., from an environment characterized by CCI to an environment characterized by white noise interference, may significantly affect the efficiency of the detector since the pre-defined detection algorithm may be sensitive to a particular interference type.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
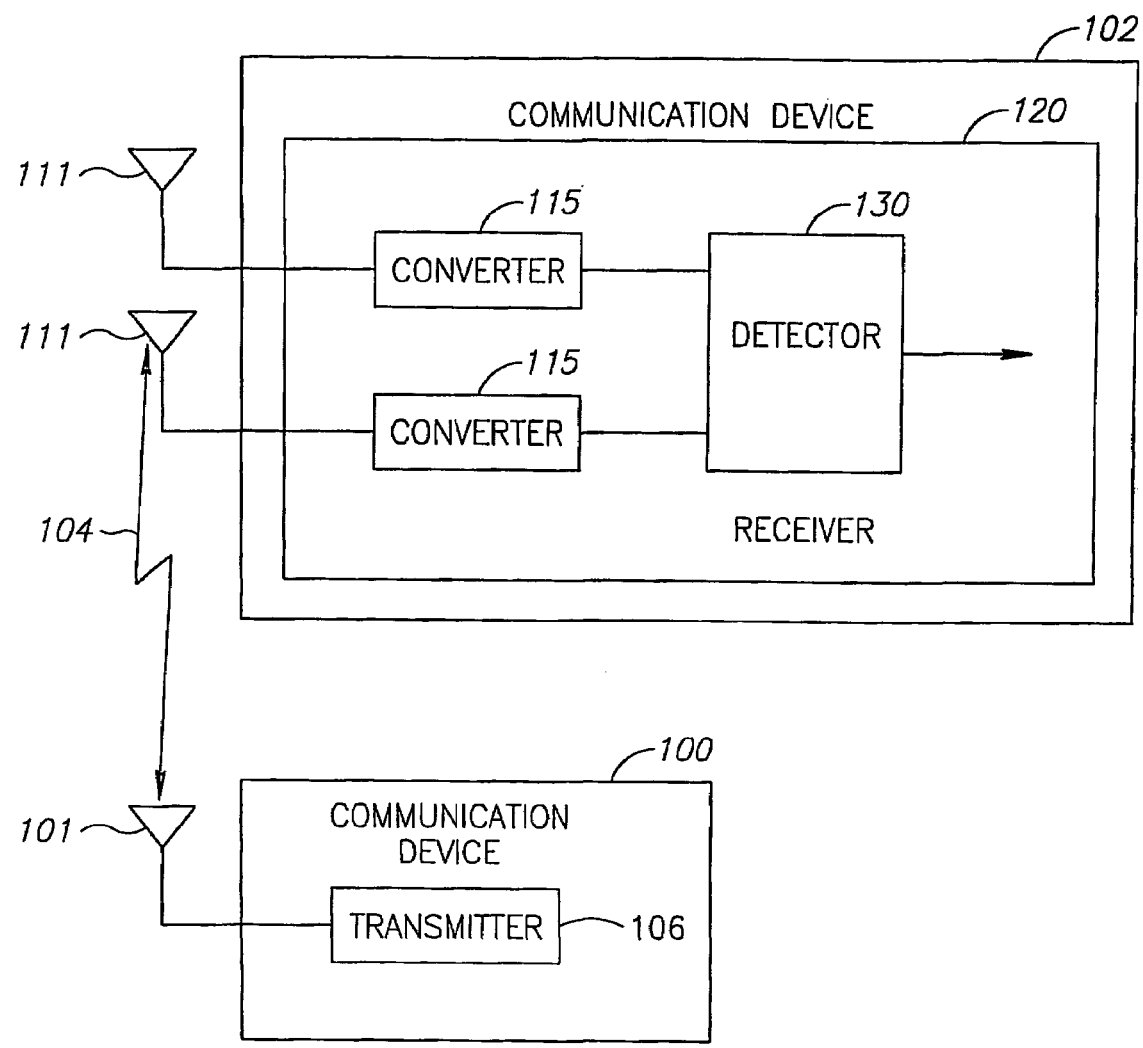
FIG. 1 is a simplified block diagram of a communication system in accordance with some exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that embodiments of the present invention may be used in a variety of applications. Although the scope of the present invention is not limited in this respect, the circuits and techniques disclosed herein may be used in many apparatuses such as receivers of a radio system. Receivers intended to be included within the scope of the present invention include, by a way of example only, cellular radiotelephone receivers, spread spectrum receivers, digital system receivers and the like.

Types of cellular radiotelephone receivers intended to be within the scope of the present invention include, although not limited to, Code Division Multiple Access (CDMA), CDMA 2000 and wideband CDMA (WCDMA) cellular radiotelephone, receivers for receiving spread spectrum signals, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), wide area network (WAN), or a global communication network, for example, the Internet.

Reference is made to FIG. 1, which schematically illustrates an exemplary communication system in accordance with some embodiments of the present invention, enabling a first communication device 100 to communicate with a second communication device 102 over a communication channel 104.

Although the scope of the present invention is not limited in this respect, communication devices 100, 102 may include wireless modems of computers and communication channel 104 may be part of a WAN or a LAN. For example, the system may be a wireless LAN (WLAN) system. Alternatively, although the scope of the present invention is not limited in this respect, the communication system shown in FIG. 1 may be part of a cellular communication system, with one of communication devices 100, 102 being a base station and the other a mobile station or with both communication devices 100, 102 being mobile stations, a pager communication system, a personal digital assistant (PDA) and a server, etc. In such cases, although the scope of the present invention is in no way limited in this respect, communication device 100 may include a Radio Frequency (RF) antenna 101, and communication device 102 may include an array of m RF antennas 111, as is known in the art. Although the scope of the present invention is not limited in this respect, types of antennas that may be used for antenna 101 and/or antennas 111 may include but are not limited to internal antenna, dipole antenna, omni-directional antenna, a monopole antenna, an end fed antenna, a circularly polarized antenna, a micro-strip antenna, a diversity antenna and the like. In the case of a cellular wireless communication system, according to some embodiments of the invention, the communication system shown in FIG. 1 may be a $3^{rd}$ Generation Partnership Project (3GPP), such as, for example, Frequency Domain Duplexing (FDD), Global System for Mobile communications (GSM), Wideband Code Division Multiple Access (WCDMA) cellular system and the like.

Communication device 100 may include a transmitter 106 to transmit a signal, as is known in the art. Communication device 102 may include a receiver 120, which may include a multi-algorithm detector 130, as described in detail below. Receiver 120 may also include an array of m RF to Base-Band (BB) converters 115 to convert RF signals received by antennas 111 into m BB signals 208, as is known in the art.

In some embodiments, receiver 120 and transmitter 106 may be implemented, for example, using separate and/or integrated units, for example, using a transmitter-receiver or a transceiver.

Figure 2:
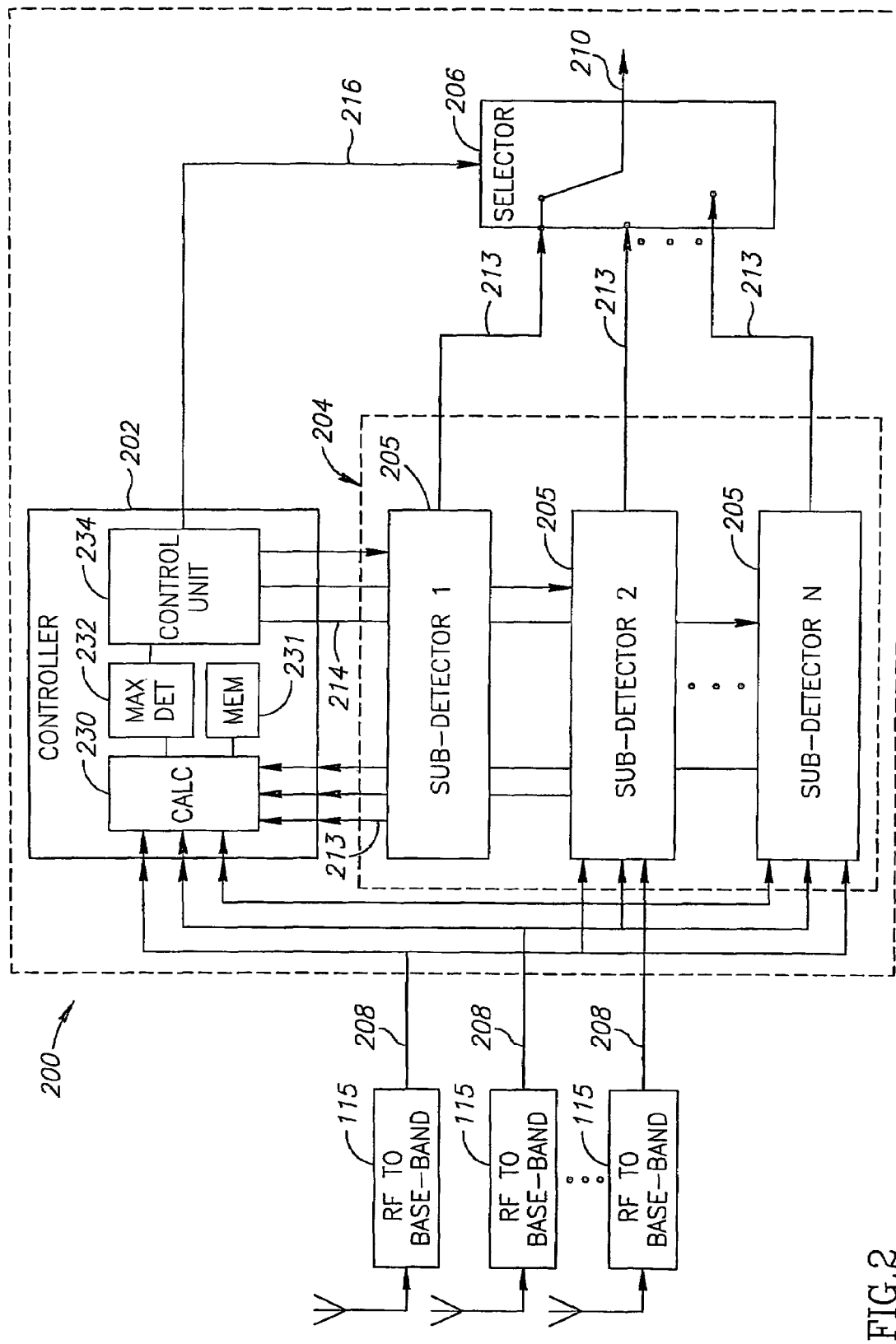
FIG. 2 is a schematic block diagram of a multi-algorithm detector according to some exemplary embodiments of the invention.

FIG. 2 schematically illustrates a block diagram of a multi-algorithm detector 200 according to some exemplary embodiments of the invention.

According to some embodiments of the invention, detector 200 may be adapted to detect the transmitted signal according to a detection algorithm selected out of two or more detection algorithms based on a pre-selected criterion, as described below.

According to some embodiments of the invention, detector 200 may receive m input signals 208. Detector 200 may include an array 204 of n sub-detectors 205, wherein n is at least two, and wherein n may be equal to or different than m. Sub-detectors 205 may have inputs associated with at least some of the m signals 208. At least some of sub-detectors 205 may be able, when activated, to detect the transmitted signal, and to provide an output signal 213 including a representation of the detected signal according to a pre-selected detection algorithm, as described below. The pre-selected detection algorithm may include any detection algorithm as is known in the art, for example, a Minimum Mean Square Error (MMSE) algorithm or a Maximal Likelihood Sequence Estimation (MLSE) algorithm, e.g., for example, the algorithm described in US Patent Application 20030123583 to Yellin Daniel et al. Output signals 213 of sub detectors 205 may be provided to a controller 202.

According to some embodiments of the invention, controller 202 may be adapted to control an output 210 of detector 200 according to pre-selected criteria, as described below. Controller 202 may receive inputs corresponding to at least some of m input signals 208. Controller may also receive inputs corresponding to one or more of n detected signals 213 from sub-detectors 205. In some embodiments, controller 202 may include a calculator 230 to calculate a value, i.e., a Quality Metric (QM), e.g., a Signal to Noise Ration (SNR), a Log Likelihood Ration (LLR), or a Mean Square Error (MSE), corresponding to signals 208 and signals 213, as described below. Controller 202 may also include a memory unit 231 to store at least some of the values calculated by calculator 230. Controller 202 may further include a max-detector 232 to detect the highest of two or more values, as described below. Max-detector 232 may include any maximum detection algorithm, as is known in the art. Controller 202 may further include a control unit 234 able to control activation of at least some of sub-detectors 205, as described below. Control unit 234 may also control the operation of a selector 206, e.g., by a control signal 216, to connect the output of a selected sub-detector 205 to output 210, as described below. Selector 206 may include any circuitry and/or software to connect the output of the selected sub-detector to output 210. For, example, selector 206 may include a switching device, as is known in the art.

According to some embodiments of the invention, controller 202 may be able to control activation of one or more of sub-detectors 205 using one or more, respective, control signals 214.

According to some embodiments of the invention, controller 202 may activate one or more of sub-detectors 205 substantially simultaneously, for example, when controller 202 operates in a "performance" mode of operation, as described in detail below.

According to other embodiments of the invention, controller 202 may activate one or more of sub-detectors 205 sequentially, for example, when controller 202 operates in a "power" mode of operation, as described in detail below.

Figure 3:
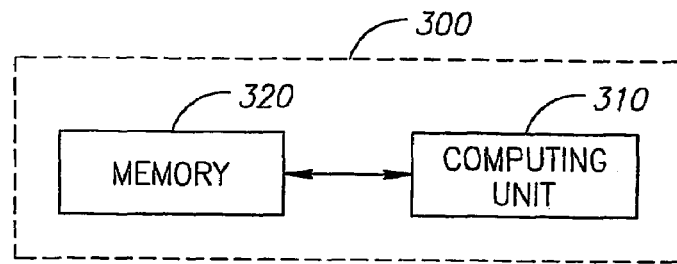
FIG. 3 is a simplified, conceptual block diagram of a calculating device in accordance with some exemplary embodiments of the present invention.

Reference is also made to FIG. 3, which conceptually illustrates a calculating device or unit 300 to perform functions in accordance with some exemplary embodiments of the present invention.

According to some exemplary embodiments of the invention, one or more of controller 202, calculator 230, max-detector 232, control unit 234, and/or one or more of sub-detectors 205 may be implemented in a unit or a number of units similar to unit 300, which may include a computing unit 310 and a memory 320 coupled to computing unit 310. Although the scope of the present invention is not limited in this respect, computing unit 310 may include an application specific integrated circuit (ASIC), a reduced instruction set circuit (RISC), a digital signal processor (DSP) or a central processing unit (CPU). The specific type of computing unit 310 and the specific number of units that may be used to implement at least some of the functions described herein may depend on specific implementations and/or design requirements. Instructions to enable computing unit to perform methods according to embodiments of the present invention may be stored in memory 320.

A QM, e.g., a SNR, a LLR, a MSE or any other suitable QM, as are known in the art, may be calculated for a detected signal, denoted y, provided by a sub-detector, e.g., by one of sub-detectors 205. According to embodiments of the invention, the calculated QM may be used for evaluating performance of the sub-detector providing the detected signal, for example, a higher calculated QM may indicate higher detection efficiency. The QM may vary according to detector-related characteristics, e.g., the detection algorithm used by the sub-detector, and/or according to non-detector related characteristics, e.g., environment-noise characteristics. The QM may be calculated using various calculation methods, as are known in the art. For example, the QM may be calculated according to a pre-decoding method or a post-decoding method, as are known in the art. For example, the QM may be calculated according to the following SNR-related equation:

$$QM = \sum_{i=1}^{l} |\hat{h}_c(i)|^2 \bigg/ \left( \frac{1}{N_2 - N_1 + 1} \sum_{j=N_1}^{N_2} |y(j) - \hat{h}_c(j) \otimes TSC(j)|^2 \right) \quad (1)$$

wherein y(i) denotes the i-th symbol of detected signal y, l denotes the number of symbols per signal, $\hat{h}_c(i)$ denotes a channel estimation tap corresponding to the i-th symbol of y, TSC(j) denotes a j-th symbol of a Training Sequence Code (TSC), and $N_1$ and $N_2$ denote first and last indices of the TSC, respectively, as are known in the art. For example, N1 and N2 may be 1 and 26, respectively, if a pre-decoding method is used, and N1 and N2 may be 1 and 148, respectively, if a post-decoding method is used.

Figure 4:
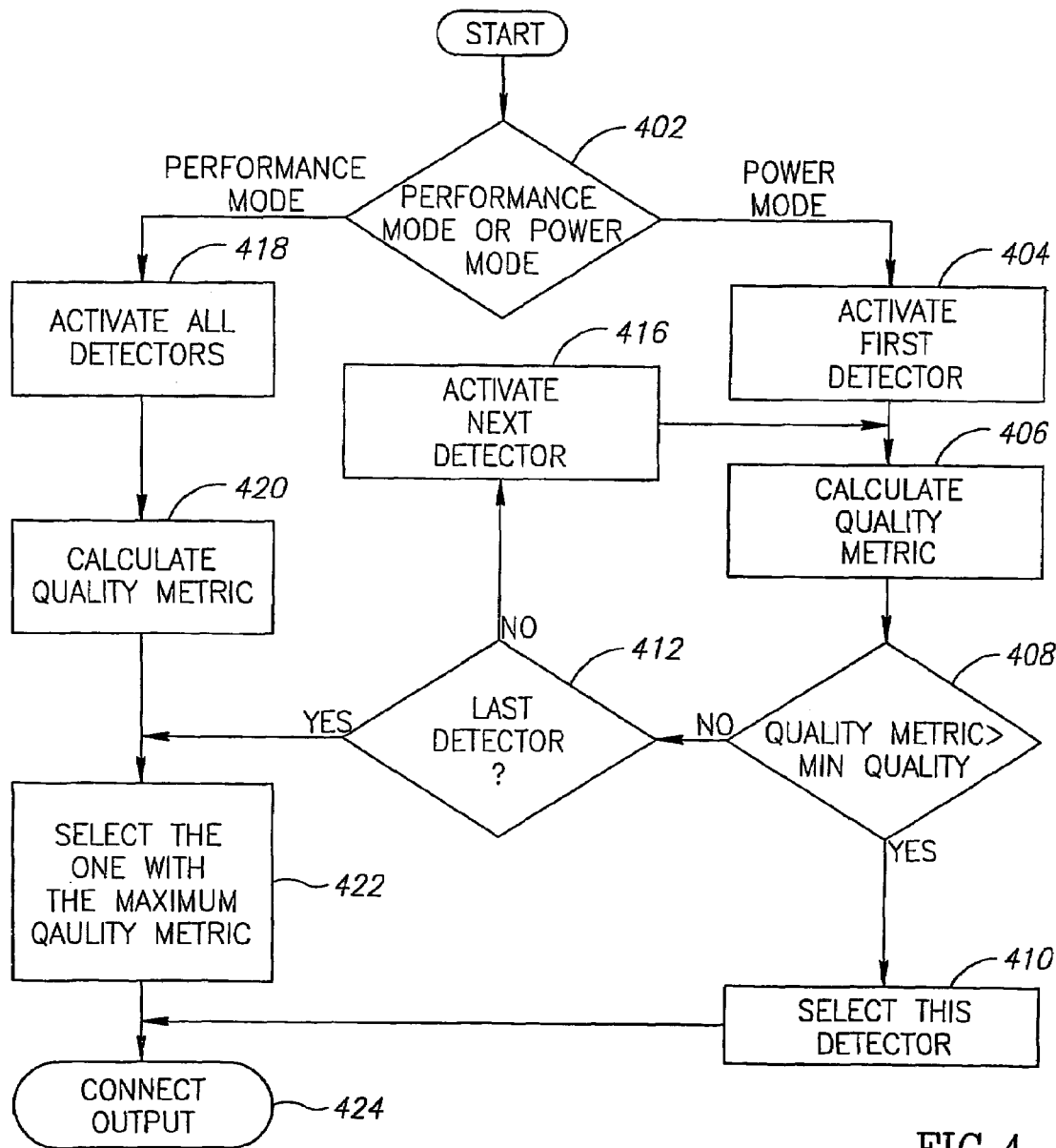
FIG. 4 is a schematic flow-chart illustration of a multi-algorithm detection method, according to some exemplary embodiments of the invention.

Reference is also made to FIG. 4, which schematically illustrates a flow chart of a multi-algorithm detection method, which may be implemented by a multi-algorithm detector, e.g., detector 200, according to some exemplary embodiments of the invention.

According to exemplary embodiments of the invention, the method may include selecting a mode of operation, e.g., a "performance" mode of operation or a "power" mode of operation, as indicated at block 402. According to some embodiments of the invention, if the performance mode is selected, a criterion for selecting the detection algorithm may relate to a highest, e.g., a maximal, quality value, e.g., QM, as described below. If the power mode is selected, the criterion for selecting the detection algorithm may relate to a pre-selected minimum quality value, e.g., QM, as described below. According to some embodiments, the modes of operation may be selected manually, e.g., by a user. According to other embodiments, the mode of operation may be selected automatically, e.g., by controller 202. For example, control unit 234 may be able to select between the two modes of operation according to an energy level of a power source, e.g., a battery, used to supply detector 200 with electric energy.

If the performance mode of operation is selected at block 402, at least some of sub-detectors 205 may be activated substantially simultaneously, as indicated at block 418. For example, control unit 234 may activate, e.g., by signals 214, at least some of sub-detectors 205.

As indicated at block 420, according to some embodiments of the invention, a QM corresponding to the outputs of activated sub-detectors 205 may be calculated, e.g., by calculator 230, for example, using Equation 1. The QMs calculated by calculator 230 may be stored in memory 231.

As indicated at block 422, a highest QM of the calculated QMs may be detected, e.g., by max-detector 232, and a sub-detector corresponding to the highest QM may be selected, e.g., by control unit 234.

As indicated at block 424, the output of the detector may be connected to an output of the selected sub-detector. For example, a selector, e.g., selector 206, may be controlled, e.g., by control signal 216, to connect output 210 to the output of the selected sub-detector.

If the power mode of operation is selected at block 402, one or more of the sub-detectors may be activated sequentially, e.g., by control unit 234, according to a predetermined activation sequence. For example, as indicated at block 404, a first sub-detector may be activated according to the activation sequence. According to one exemplary embodiment of the invention, the activation sequence may be predetermined according to an estimated performance value of the sub-detectors, e.g., corresponding to previously detected signals. According to another exemplary embodiment of the invention, the activation sequence may be predetermined according to the robustness level of the sub-detectors, e.g., according to the type and/or number of environments in which the sub-detector is adapted to operate.

As indicated at block 406, according to some embodiments of the invention, a QM corresponding to the output of the active sub-detector may be calculated, e.g., by calculator 230, for example, using Equation 1.

As indicated at block 408, the QM of the active sub-detector may be compared, e.g., by control unit 234, with a preset minimum-quality value. The minimum-quality value may be preset according to specific implementations. For example, in a GSM network a minimum-quality value of 100, e.g., corresponding to a 20 dB SNR, may be implemented.

If the QM corresponding to the active sub-detector is equal to or higher than the minimum-quality value, the active sub-detector may be selected, e.g., by controller 202, as indicated at block 410. The output of the detector may be associated with an output of the selected sub-detector, as described above (block 424).

As indicated at block 412, if the QM corresponding to the active sub-detector is lower than the minimum-quality value, the QM may be stored in a memory, e.g., memory 231. The method may include determining whether a currently activated sub-detector is the last sub-detector, i.e. if a QM has been calculated for all the other sub-detectors. This may be accomplished, for example, by implementing a counter (not shown), as is known in the art, to count the number of QM calculations performed. According to this example, control unit 234 may determine that the currently activated sub detector is the last sub-detector to be activated in the predetermined sequence when a value of the counter equals the number of sub-detectors 205 in array 204.

If the currently activated sub-detector is determined to be the last sub-detector to be activated in the predetermined sequence, a highest QM of the calculated QMs stored in the memory may be detected, e.g., by max-detector 232. The sub-detector corresponding to the maximal QM may be selected, e.g., by control unit 234, as indicated at block 422. Thus, according to some embodiments, the QM corresponding to the selected sub-detector in the power mode of operation may be lower than the minimum-quality value, but higher than the QM corresponding to the other sub-detectors 205 in array 204.

As indicated at block 416, if the currently activated sub-detector is determined not to be the last sub-detector, the active sub-detector may store at least some values, e.g., y(i) and/or $\hat{h}_c(i)$, calculated by the active sub-detector, the active sub-detector may be de-activated, e.g., by control unit 234, and the next sub-detector 205 according to the activation sequence may be activated, e.g., by control unit 234. The QM corresponding to the newly activated detector may be calculated, e.g., by calculator 230, as described above (block 406).

Figure 5:
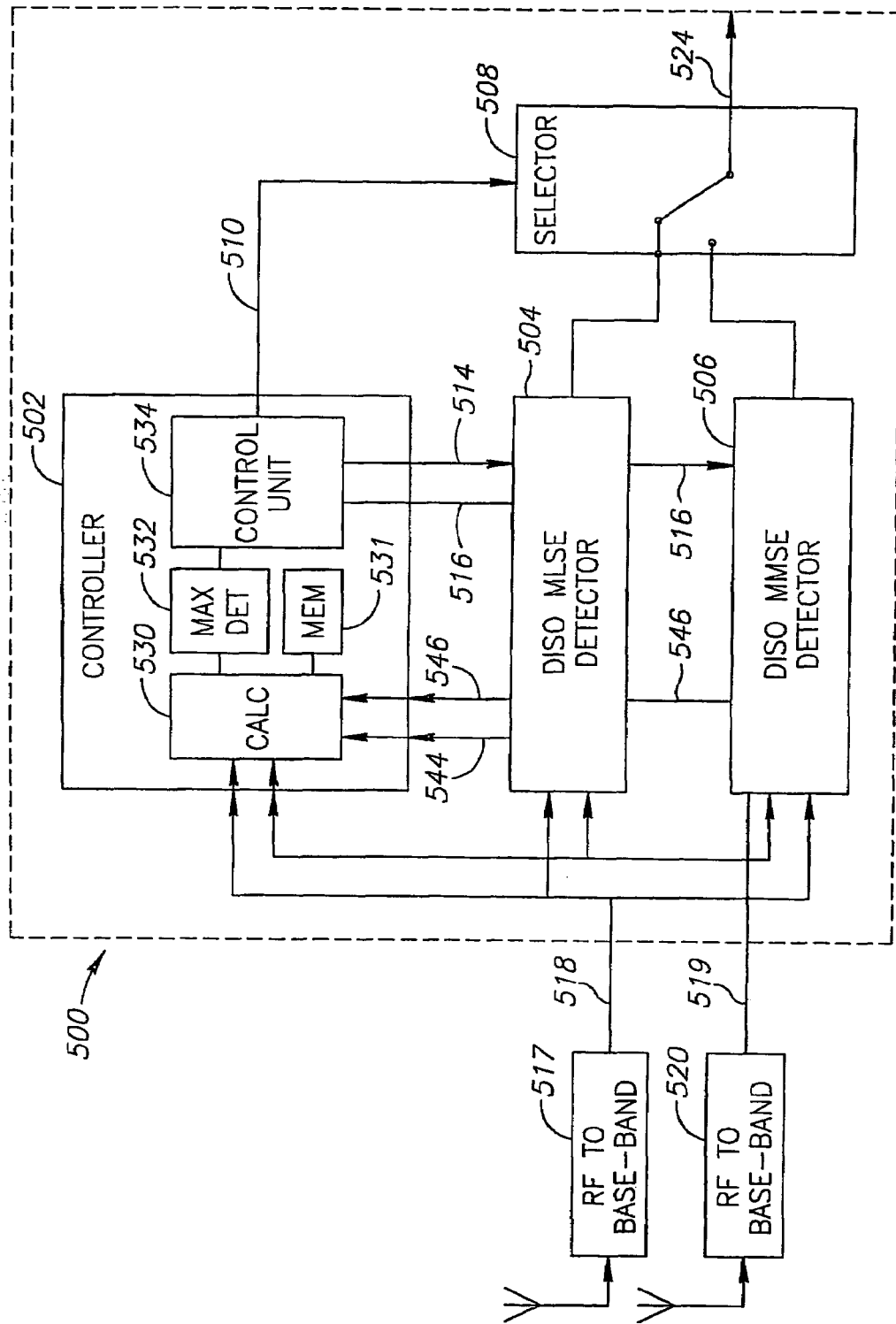
FIG. 5 is a schematic block diagram of a dual-algorithm detector according to some exemplary embodiments of the invention.

Reference is made to FIG. 5, which schematically illustrates a block diagram of a dual-algorithm detector 500 according to some exemplary embodiments of the invention.

According to some exemplary embodiments of the invention, detector 500 may receive a first input signal 518 from a first RF to BB converter 517, and a second input signal 519 from a second RF to BB converter 520. Detector 500 may include a Dual Input Single Output (DISO) MLSE detector 504, a DISO MMSE detector 506, and a DISO selector 508, as are known in the art. MLSE detector 504 may be efficient for an environment characterized by white noise, and MMSE detector 506 may be efficient for an environment characterized by an interference created predominantly by one or more interferers. Detector 500 may also include a controller 502 to control an output 524 of detector 500 according to predetermined criteria, as described below.

Controller 502 may include a calculator 530 to calculate a QM corresponding to an output of detector 504 or an output of detector 506. For example, calculator 534 may implement Equation 1 to calculate the QM. Controller 502 may also include a memory unit 531 to store at least some values calculated by calculator 230. Controller 502 may further include a max-detector 532, e.g., as described above. Detector 502 may further include a control unit 534 able to control activation of at least one of detectors 504 and 506, as described below. Unit 534 may also control selector 506, e.g., by a control signal 510, to connect output 524 to an output of one of detectors 504 and 506, as described below.

Figure 6:
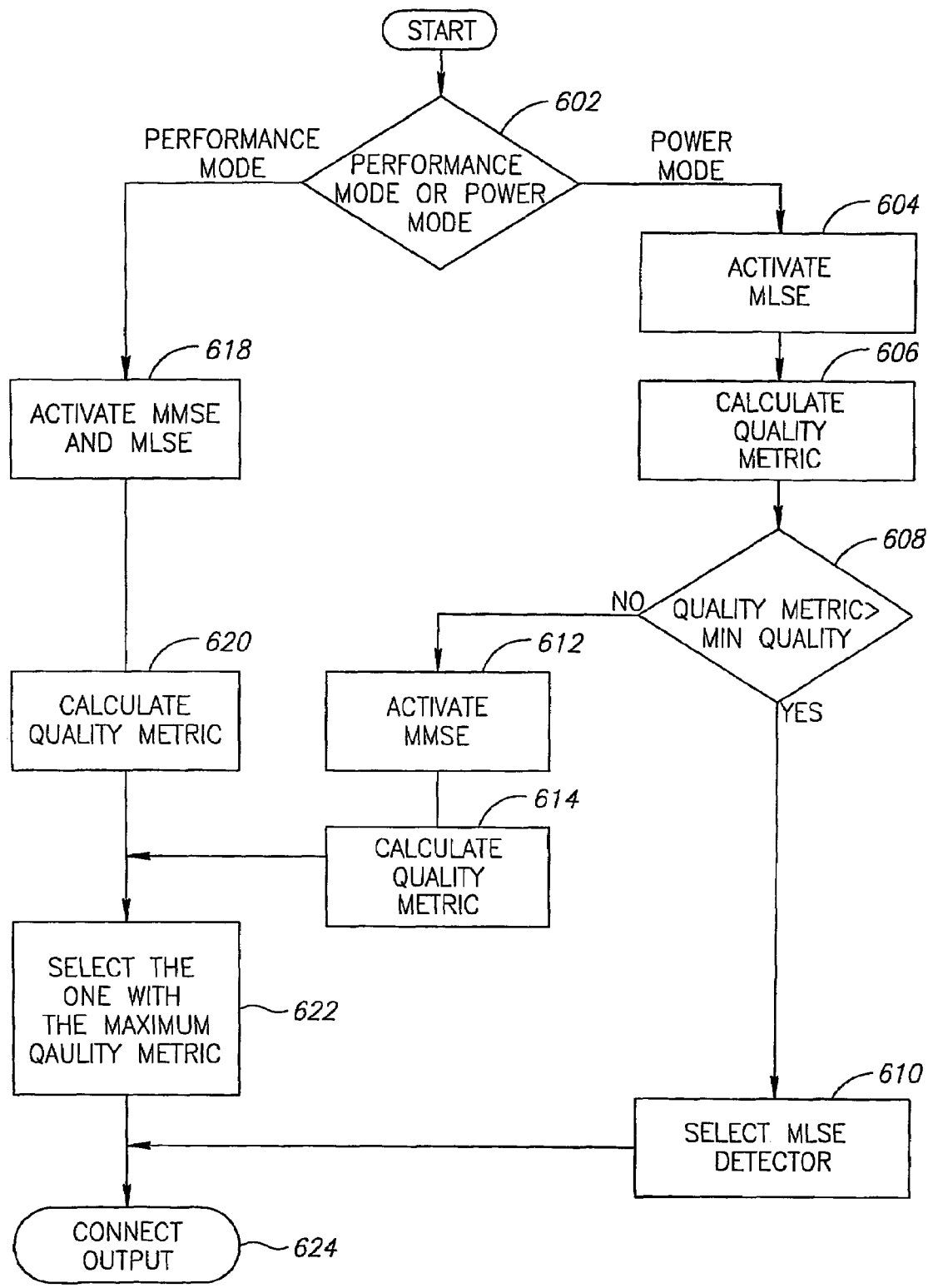
FIG. 6 is a schematic flow-chart of a dual-algorithm detection method according to some exemplary embodiments of the invention.

Reference is also made to FIG. 6, which schematically illustrates a flow chart of a dual-algorithm detection method, which may be implemented by detector 500, according to some exemplary embodiments of the invention.

According to some exemplary embodiments of the invention, a mode of operation, e.g., a performance mode of operation or a power mode of operation, may be selected, as indicated at block 602. According to some embodiments, the mode of operation may be selected manually, e.g., by a user. According to other embodiments, the mode of operation may be selected automatically, e.g., by control unit 534. For example, control unit 534 may be able to select between the two modes of operation according to an energy level of a power source, e.g., a battery, used to supply detector 500 with electric energy.

If the performance mode of operation is selected at block 602, control unit 534 may activate detectors 504 and 506 substantially simultaneously, e.g., by signals 514 and 516, respectively, as indicated at block 618.

As indicated at block 620, according to some embodiments of the invention, calculator 530 may calculate two QMs corresponding to outputs 544 and 546 of detectors 504 and 506, respectively. The QMs calculated by calculator 530 may be stored in memory 531.

As indicated at block 622, max-detector 532 may detect a highest QM of the QMs corresponding to detectors 504 and 506, respectively. Control unit 534 may select from detectors 504 and 506 the detector corresponding to the maximal QM.

As indicated at block 624, control unit 534 may control the operation of selector 508, e.g., by control signal 510, to connect output 524 to an output of the selected detector.

If the power mode of operation is selected at block 602, control unit 534 may activate one of detectors 504 and 506, the detector to be activated may be predetermined, e.g., as described above. For example, detector 504 may be activated, e.g., by signal 514, as indicated at block 604.

As indicated at block 606, according to some embodiments of the invention, calculator 530 may calculate a QM, e.g., according to Equation 1, corresponding to the output of the active detector, e.g., detector 504.

As indicated at block 608, control unit 534 may compare the QM of the active detector, e.g., detector 504, with a preset minimum-quality value. The minimum-quality value may be preset according to specific implementations of detector 500, e.g., as described above with reference to block 408.

If the QM of the active detector, e.g., detector 504, is equal to or higher than the minimum-quality value, control unit 534 may select the active detector, e.g., detector 504, as indicated at block 610. Control unit 534 may control selector 508, e.g., using control signal 510, to associate output 524 with the output of the selected detector, as indicated at block 624.

As indicated at block 612, if the QM of the active detector, e.g., detector 504, is lower than the minimum-quality value, control unit 534 may store the QM corresponding to the active detector in memory 531. Control unit 534 may also activate the un-active detector, e.g., detector 506, e.g., by signal 516.

As indicated at block 614, calculator 530 may calculate a QM, e.g., according to Equation 1, corresponding to the output of detector 506. Max-detector 532 may detect a highest QM of the calculated QMs corresponding to detectors 504 and 506, respectively, as indicated at block 622.

It will be appreciated by persons skilled in the art that the multi-algorithm detectors described above have a significantly improved detection ability in a changing environment, compared to the detection ability of prior art detectors under comparable operational conditions. For example, Spatial Interference Cancellation (SIC) detection methods, as are known in the art, may have relatively optimal performance in environments characterized by an interference of one dominant interferer arriving from a different location than the signal to be detected. However, SIC methods may have relatively sub-optimal performance in environments characterized by an interference of a multiplicity of interference sources positioned in different locations. The multi-algorithm detector, according to embodiments of the invention, may provide relatively optimal performance in different environment types, e.g., the environments described above, by utilizing a multiplicity of multiple-antenna detection algorithms.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
a multi-algorithm detector having two or more sub-detectors to detect a signal according to a detection algorithm selected from two or more detection algorithms and a controller to choose a mode of operation for the selection of the detection algorithm from at least a power mode of operation and a performance mode of operation, wherein the selection of the detection algorithm is based on a predetermined selection criterion associated with a chosen mode of operation, such that if the performance mode of operation is chosen, said controller is to activate at least two of said sub-detectors substantially simultaneously.

2. The apparatus of claim 1 wherein said controller is to control the selection of said detection algorithm according to outputs of said sub-detectors.

3. The apparatus of claim 2 wherein said controller is to control activation of one or more of said two or more sub-detectors.

4. The apparatus of claim 1 wherein if a power mode of operation is chosen, said controller is to activate only one of said two or more sub-detectors or sequentially activate at least two of said sub-detectors according to a preset sequence.

5. The apparatus of claim 2 wherein said controller comprises a calculator to calculate a quality metric corresponding to one or more of said sub-detectors.

6. The apparatus of claim 5 wherein said quality metric comprises a quality metric selected from the group consisting of a signal to noise ratio, a log likelihood ratio, and a mean square error.

7. The apparatus of claim 5 wherein said controller comprises a max-detector to detect a highest quality metric of two or more quality metrics corresponding to two or mare of said sub-detectors, respectively.

8. The apparatus of claim 1 wherein the predetermined selection criterion associated with the power mode of operation relates to a preset minimum quality value.

9. The apparatus of claim 1 wherein the predetermined selection criterion associated with the performance mode of operation relates to a highest quality metric of two or more quality metrics corresponding to said detection algorithms.

10. The apparatus of claim 1 wherein one or more of said detection algorithms comprises a minimum mean square error algorithm.

11. The apparatus of claim 1 wherein one or more of said detection algorithms comprises a maximal likelihood sequence estimation algorithm.

12. A wireless communications device comprising:
two or more antennas to receive a signal;
a multi-algorithm detector having two or more sub-detectors to detect the signal according to a detection algorithm selected from two or more detection algorithms and a controller to choose a mode of operation for the selection of the detection algorithm from at least a power mode of operation and a performance mode of operation, wherein the selection of the detection algorithm is based on a predetermined selection criterion associated with a chosen mode of operation, such that if the performance mode of operation is chosen, said controller is to activate at least two of said sub-detectors substantially simultaneously.

13. The device of claim 12 wherein said controller is to control the selection of said detection algorithm according to outputs of said sub-detectors.

14. The device of claim 13 wherein said controller comprises a calculator to calculate a quality metric corresponding to one or more of said sub-detectors.

15. The device of claim 14 wherein said quality metric comprises a quality metric selected from the group consisting of a signal to noise ratio, a log likelihood ratio, and a mean square error.

16. The device of claim 14 wherein said controller comprises a max-detector to detect a highest quality metric of two or more quality metrics corresponding to two or more of said sub-detectors, respectively.

17. The device of claim 12 wherein the predetermined selection criterion associated with the power mode of operation relates to a preset minimum quality value.

18. The device of claim 12 wherein the predetermined selection criterion associated with the performance mode of operation relates to a highest quality metric of two or more quality metrics corresponding to said detection algorithms.

19. A method for use by a detector, the method comprising:
choosing a mode of operation for the selection of a signal-detection algorithm from at least a power mode of operation and a performance mode of operation; and
selecting the signal-detection algorithm from two or more detection algorithms, wherein the selection of the detection algorithm is based on a predetermined selection criterion associated with a chosen mode of operation such that if the performance mode of operation is chosen, at least two sub-detectors of the detector are activated substantially simultaneously.

20. The method of claim 19 wherein the chosen mode of operation is the performance mode of operation and the method comprises:
calculating two or more quality metrics corresponding to said two or more signal-detection algorithms, respectively; and
selecting from the two or more signal-detection algorithms a signal-detection algorithm corresponding to a highest quality metric of said calculated metrics.

21. The method of claim 19 wherein the chosen mode of operation is the power mode of operation and the method comprises:
calculating according to a predetermined sequence a first quality metric corresponding to a first signal-detection algorithm of said two or more signal-detection algorithms;
selecting the first signal-detection algorithm if the first quality metric has a value higher than a preset minimum-quality value;
calculating according to the predetermined sequence a second quality metric corresponding to a second signal-detection algorithm of said two or more signal-detection algorithms, if the first quality metric has a value lower than the preset minimum-quality value; and
selecting the second signal-detection algorithm if the second quality metric has a value higher than the preset minimum-quality value.

22. An article comprising a computer readable medium having stored thereon instructions that, when executed by a processing platform, result in:
choosing a mode of operation for the selection of a signal-detection algorithm from at least a power mode of operation and a performance mode of operation; and
selecting the signal-detection algorithm from two or more detection algorithms, wherein the selection of the detection algorithm is based on a predetermined selection criterion associated with a chosen mode of operation such that if the performance mode of operation is chosen, at least sub-detectors of a detector implementing the detection algorithms are activated substantially simultaneously.

23. The article of claim 22 wherein when the chosen mode of operation is the performance mode of operation the instructions further result in:

calculating two or more quality metrics corresponding to said two or more signal-detection algorithms, respectively; and selecting from the two or more signal-detection algorithms a signal-detection algorithm corresponding to a highest quality metric of said calculated metrics.

24. The article of claim 22 wherein when the chosen mode of operation is the power mode of operation the instructions further result in:

calculating according to a predetermined sequence a first quality metric corresponding to a first signal-detection algorithm of said two or more signal-detection algorithms;

selecting the first signal-detection algorithm if the first quality metric has a value higher than a preset minimum-quality value;

calculating according to the predetermined sequence a second quality metric corresponding to a second signal-detection algorithm of said two or more signal-detection algorithms, if the first quality metric has a value lower than the preset minimum-quality value; and selecting the second signal-detection algorithm if the second quality metric has a value higher than the preset minimum-quality value.

25. A communication system comprising:

a first communication device to transmit a signal through a communication channel; and a second communication device to receive said signal, said second communication device comprising a multi-algorithm detector having two or more sub-detectors to detect the signal according to a detection algorithm selected from two or more detection algorithms and a controller to choose a mode of operation for the selection of the detection algorithm from at least a power mode of operation and a performance mode of operation, wherein the selection of the detection algorithm is based on a predetermined selection criterion associated with a chosen mode of operation, such that if a performance mode of operation is chosen, said controller is to activate at least two of said sub-detectors substantially simultaneously.

26. The system of claim 25 wherein said controller is to control the selection of said detection algorithm according to outputs of said sub-detectors.

27. The system of claim 26 wherein said controller is to control activation of one or more of said two or more sub-detectors.

28. The system of claim 26 wherein said controller comprises a calculator to calculate a quality metric corresponding to one or more of said sub-detectors.

29. The system of claim 28 wherein said quality metric comprises a quality metric selected from the group consisting of a signal to noise ratio, a log likelihood ratio, and a mean square error.

30. The system of claim 28 wherein said controller comprises a max-detector to detect a highest quality metric of two or more quality metrics corresponding to two or more of said sub-detectors, respectively.

31. The system of claim 25 wherein one or more of said detection algorithms comprises a minimum mean square error algorithm.

32. The system of claim 25 wherein one or more of said detection algorithms comprises a maximal likelihood sequence estimation algorithm.

* * * * *